United States Patent [19]

Kanno

[11] Patent Number: 5,386,633
[45] Date of Patent: Feb. 7, 1995

[54] HAMBURGER PATTY KNIFE WITH BLADE ATTACHMENT

[76] Inventor: Yukio Kanno, 260 Garth Rd., Apt. 6B4, Scarsdale, N.Y. 10583

[21] Appl. No.: 172,907

[22] Filed: Dec. 27, 1993

[51] Int. Cl.$^6$ ............................................. A47J 43/28
[52] U.S. Cl. ........................................ 30/169; 30/339; 30/335; 30/123; 15/236.01; 294/7
[58] Field of Search ................ 30/169, 322, 335, 339; 294/7; 15/236.01; D7/688

[56] References Cited

U.S. PATENT DOCUMENTS

| | | | |
|---|---|---|---|
| 1,364,332 | 1/1921 | Verstraete | 294/7 |
| 2,350,157 | 5/1944 | Disse | 30/169 |
| 3,092,411 | 6/1963 | Hardy | 30/169 |
| 3,250,561 | 5/1966 | Wilson | 294/7 |
| 3,753,587 | 8/1973 | Godlewski | 294/7 |
| 4,569,130 | 2/1986 | Koller et al. | 30/128 |
| 4,848,816 | 7/1989 | Anderson | 294/7 |
| 5,176,418 | 1/1993 | Niu | 294/7 |

*Primary Examiner*—Eugenia Jones
*Assistant Examiner*—Allan M. Schrock
*Attorney, Agent, or Firm*—Richard L. Miller

[57] ABSTRACT

A hamburger patty knife is provided which comprises a handle and a transition piece at one end of the handle forming an angle with the longitudinal axis of the handle. A flat plate extends away from the transition piece in a forward longitudinal direction. A blade attachment is provided having a beveled front edge. A structure is for securing the blade attachment to a distal edge of the plate in a removable manner. The beveled front edge of the blade attachment can be used to pick up and turn over a hamburger patty without disrupting the shape of the hamburger patty. Alternatively the blade can be installed in an upside down position which is extremely useful for cleaning dirty grills and pans.

1 Claim, 1 Drawing Sheet

U.S. Patent
Feb. 7, 1995
5,386,633
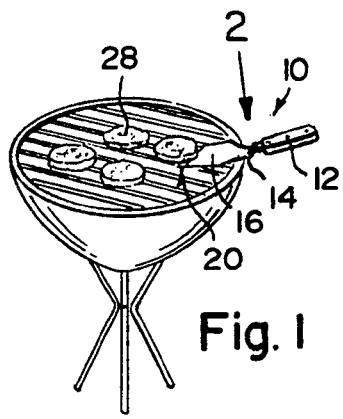
Fig. 1
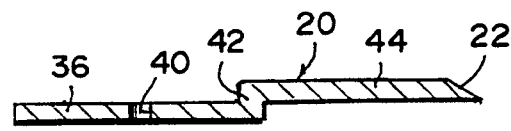
Fig. 7
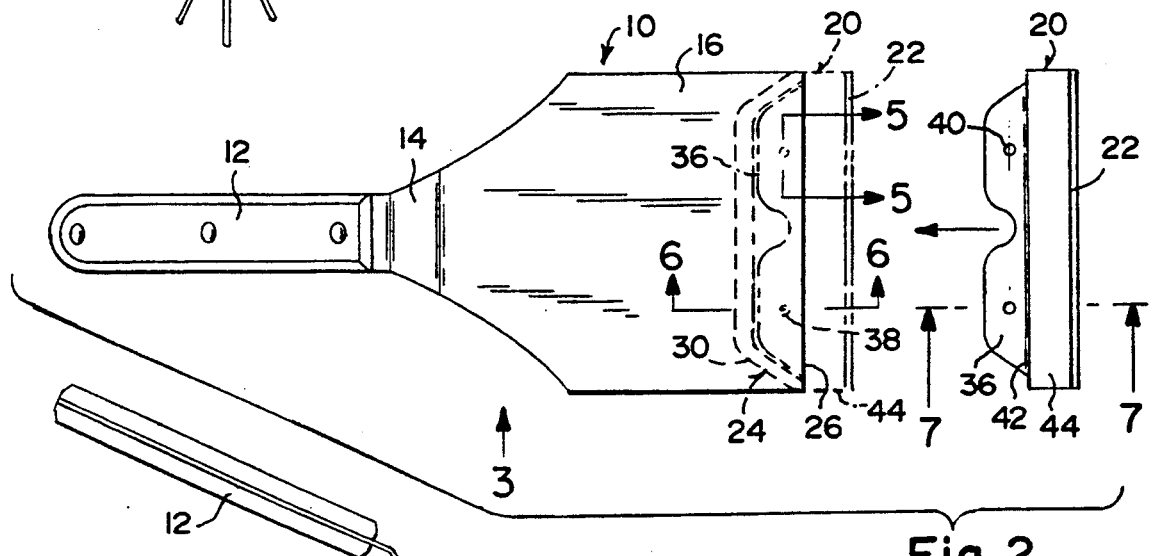
Fig. 2
Fig. 3
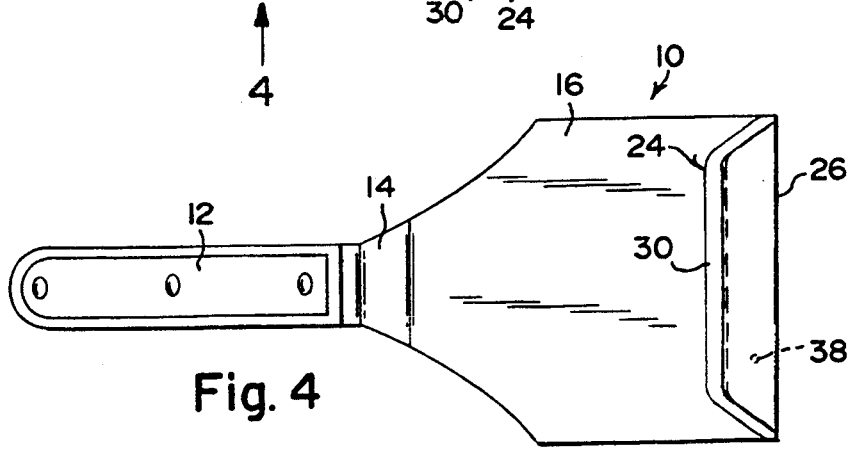
Fig. 4
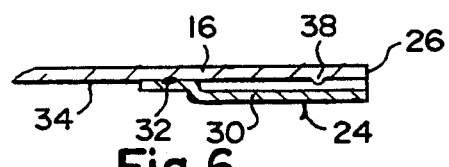
Fig. 6
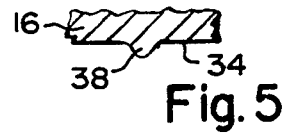
Fig. 5

HAMBURGER PATTY KNIFE WITH BLADE ATTACHMENT

BACKGROUND OF THE INVENTION

The instant invention relates generally to kitchen utensils and more specifically it relates to a hamburger patty knife with a replaceable blade attachment.

Numerous kitchen utensils have been provided in prior art that are adapted to handle various kinds of foods during their preparation and can then be utilized in serving the foods after preparation. For example, U.S. patents numbered U.S. Pat. No. 3,753,587 to Godlewski; U.S. Pat. No. 4,569,130 to Koller et al.; U.S. Pat. No. 4,848,816 to Anderson and U.S. Pat. No. 5,176,418 to Niv all are illustrative of such prior art. While these units may be suitable for the particular purpose to which they address, they would not be as suitable for the purposes of the present invention as heretofore described.

SUMMARY OF THE INVENTION

A primary object of the present invention is to provide a hamburger patty knife with blade attachment that will overcome the shortcomings of the prior art devices.

Another object is to provide a hamburger patty knife with blade attachment which will eliminate the need for resharpening the blade edge since the blade attachment is replaceable.

An additional object is to provide a hamburger patty knife with blade attachment that can be quickly detached from the knife, so as to enable the knife and blade attachment to be properly cleaned.

A further object is to provide a hamburger patty knife with blade attachment that is simple and easy to use.

A still further object is to provide a hamburger patty knife with blade attachment that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a diagrammatic perspective view illustrating the instant invention in use;

FIG. 2 is an enlarged top view taken in the direction of arrow 2 in FIG. 1 of just the instant invention per se with the blade attachment exploded therefrom;

FIG. 3 is a side view taken in the direction of arrow 3 in FIG. 2 with the blade attachment installed thereon;

FIG. 4 is a bottom view taken in the direction of arrow 4 in FIG. 3 with the blade attachment removed;

FIG. 5 is a cross sectional view with parts broken away taken on line 5—5 of FIG. 2;

FIG. 6 is a cross sectional view with parts broken away taken on line 6—6 of FIG. 2; and FIG. 7 is an enlarged cross sectional view of just the blade per se taken on line 7—7 of FIG. 2.

DETAILED DESCRIPTION OF THE PREFERRED EMBODIMENTS

Turning now descriptively to the drawings, in which similar reference characters denote similar elements throughout the several views, FIGS. 1 through 7 illustrate an improved hamburger patty knife 10, which consists of a handle 12 and a transition piece 14 at one end of the handle 12, forming an angle with the longitudinal axis of the handle 12. A flat plate 16 extends away from the transition piece 14 in a forward longitudinal direction. A blade attachment 20 is provided having a beveled front edge 22. A structure 24 is for securing the blade attachment 20 to a distal edge 26 of the plate in a removable manner. The beveled front edge of the blade attachment 20 can be used to pick up and turn over a hamburger patty 28, without disrupting the shape of the hamburger patty 28.

The securing structure 24 includes an offset member 30 secured at 32 typically but not necessarily by tack welds to the bottom surface 34 of the flat plate 16 at the distal edge 26 thereof, facing in a-forward longitudinal direction. The blade attachment 20 has a tongue 36 facing in a rearward longitudinal direction, which can be inserted into the offset member 30.

The securing structure 24 further contains the flat plate 16 having a pair of spaced apart projections 38 on the bottom surface 34 extending into the offset member 30. The tongue 36 has a pair of spaced apart aperture 40 therein. When the tongue 36 is inserted into the offset member 30, the projections 38 align with and will enter the apertures 40, to help retain the tongue 36 within the offset member 30.

The tongue 36 of the blade attachment 20 includes a step up portion 42. It is to be noted when the tongue 36 is inserted as illustrated in FIG. 3 between the offset member 30 and the flat plate 16 at the distal edge 26 thereof, a forward portion 44 of the blade attachment 20 will be flush with the flat plate 16.

Alternatively when the tongue 36 is turned so the blade is upside down and inserted, as not illustrated, between the offset member 30 and the flat plate 16 at the distal edge 26 thereof, a forward portion 44 of the blade attachment 20 will be flush with the offset member 30. This alternate position is particularly useful when cleaning a dirty grill or pan surface.

OPERATION OF THE INVENTION

To use the hamburger patty knife 10, a person simply inserts the tongue 36 of the blade attachment 20 into the offset member 30, so that the forward portion 44 will be flush with the flat plate 16. The handle 12 will be gripped, so that the beveled front edge 22 of the blade attachment 20 will be used to pick up and turn over hamburger patties 28. When the beveled front edge 22 becomes blunt, the tongue 36 can be removed from the offset member 30. A new blade attachment 20 can then be utilized instead of trying to resharpen the beveled front edge 22 of the old blade attachment 20.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A hamburger patty knife which comprises:
    a) an elongate handle;
    b) a transition piece at one end of said handle forming an angle with the longitudinal axis of said handle;
    c) a flat plate extending away from said transition piece in a forward longitudinal direction and having a width dimension extending transversely of a longitudinal axis at least as great as a length dimension extending along the axis, said flat plate having a top, flat, patty supporting surface and a bottom surface, and a pair of spaced apart projections on the bottom surface;
    d) a plate-like securing member attached in spaced apart relation to the bottom surface and extending across the width dimension of said flat plate at an edge thereof distal from the handle and facing in a forward longitudinal direction, with the pair of spaced apart projections extending towards said securing member;
    e) a blade attachment having a front edge portion bevelled to form a pointed edge and having a width dimension extending transversely of the longitudinal axis equal to the width dimension of the flat plate and a length dimension extending along the axis which is small relative to the width dimension, a tongue on said blade attachment facing in a rearward longitudinal direction and a pair of spaced apart apertures in said tongue, said tongue being insertable between said plate-like securing member and said distal edge of said plate so that said projections enter said apertures to help retain said tongue within said plate-like securing member wherein said blade attachment is removably secured to the distal edge of the flat plate, said tongue of said blade attachment including a step up portion, so that when said tongue is inserted within said plate-like securing member in a first position, a forward portion of said blade attachment is flush with said top surface of said plate, with the pointed edge lowermost, whereby said beveled front edge of said blade attachment can pick up and turn over a hamburger patty without disrupting the shape of the hamburger patty, and when said tongue is inserted within said plate-like securing member in a second alternative, upside down position, with the pointed edge uppermost, the forward portion of said blade attachment is flush with a bottom surface of said plate-like securing member whereby said bevelled front edge can clean a dirty cooking surface.

* * * * *